United States Patent Office 3,639,332
Patented Feb. 1, 1972

3,639,332
CRYSTALLINE POLYSTYRENE COMPOSITIONS
Harry W. Coover, Jr., and Donald J. Shields, Kingsport, Tenn., assignors to Eastman Kodak Company, Rochester, N.Y.
No Drawing. Continuation of application Ser. No. 595,564, Nov. 16, 1966, which is a continuation of application Ser. No. 41,723, July 11, 1960. This application Aug. 5, 1968, Ser. No. 751,693
Int. Cl. C08f 7/04
U.S. Cl. 260—33.8
3 Claims

ABSTRACT OF THE DISCLOSURE

Oriented crystalline polystyrene having heat distortion temperatures of at least 200° C. which will not disorient at high temperatures, for example, 100-200° C. The oriented crystalline polystyrene of the invention is eminently suitable for use as a photographic support. The crystalline polystyrene of the invention can be obtained by polymerizing styrene at a temperature within the range of about 20 to about 130° C. and a pressure within the range of about 0 to 1000 p.s.i. in the presence of an ionic catalyst comprising (1) a halide of a transition metal from Groups IV-B and VI-B of the Periodic Table and (2) and aluminum alkyl. As an embodiment of the invention it has been found that one of the particular catalyst combinations provides a methylene chloride-soluble crystalline isotactic styrene polymer which permits the preparation of valuable polystyrene fibers from the ordinary dry-spinning equipment commonly used by fiber manufacturers.

---

This application is a streamlined continuation of Ser. No. 595,564 filed Nov. 16, 1966, now abandoned, which is a streamlined continuation of Ser. No. 41,723 filed July 11, 1960, now abandoned.

This invention relates to new compositions of matter and methods for their preparation. More particularly, the present invention relates to crystalline isotactic styrene polymers which have enhanced properties. In another aspect, this invention relates to photographic elements having a support of crystalline polystyrene. In a specific aspect this invention relates to crystalline polystyrene which is soluble in methylene chloride and a process for its preparation.

It is known that amorphous polystyrene, i.e. polystyrene which does not exhibit crystallinity upon X-ray analysis, can be formed into film possessing certain desirable characteristics, e.g. a heat distortion temperature of about 100° C., excellent dimensional stability and low moisture regain, which make it a valuable photographic film base. In addition, styrene is a relatively inexpensive and readily available material. However, since amorphous polystyrene film is extremely brittle, it must be biaxially oriented or drafted before it is tough enough for use as a photographic film base. The orientation can be accomplished, for example, by first extruding the polystyrene in a tubular film form having a diameter of about 2 to about 3 inches as it issues from the extruder nozzle. The polystyrene can then be stretched and oriented in all directions by well known blowing techniques. This results in expanding the tubular film to a greater diameter, for example, 2 to 8 times its original diameter. Such a multilateral drafting process permits the realization of the maximum physical properties inherent in the polystyrene film. Alternatively, the maximum physical properties can be attained, for example, by biaxially orienting the film at an elevated temperature within the range of about 80 to 150° C. The stretching can be accomplished in two stages, laterally and longitudinally, in either order or simultaneously. During the biaxial orientation the polystyrene film is reduced in thickness by about ½ to ⅛ or more while, at the same time, its area is increased 2 to 8 times or more.

The oriented polystyrene film is then oxidized to provide a surface on which the colloid subbing layer will adhere. This oxidation is accomplished by any one of a number of well known procedures, for example, by flaming or by treating the polystyrene film with an oxidizing solution such as aqueous potassium dichromate. The subbing layer is then applied followed by the emulsion layer. These layers can be deposited on the film base by any of the conventional methods used in the manufacture of photographic elements, for example, by immersion of the surface of the film into a solution of the coating material, spraying, beading or coating from a hopper provided with a doctor blade, etc.

Although the oriented amorphous polystyrene film obtained by the conventional methods such as those described above possesses many valuable characteristics, it is not suitable for use in many applications which require a material having a heat distortion temperature of 200° C. or above. In addition, when oriented amorphous polystyrene films are subjected to elevated temperatures, as in movie projectors, for example, they disorient and become brittle and are therefore of little use in such applications.

Furthermore, prior art crystalline styrene polymers, i.e. those exhibiting crystalline structures by X-ray analysis, although they possess higher heat distortion temperatures than amorphous styrene polymers, will not form a film base which is both crystalline and oriented since, during heat setting, the film will disorient faster than it will crystallize, as shown in Example 4 which follows. Obviously then, such prior art crystalline styrene polymers are of no particular value as film supports.

It is evident, therefore, that the state of the art, particularly in the photographic field, will be enhanced by providing a class of crystalline styrene polymers which, in addition to having heat distortion temperatures of 200° C. or higher, will not disorient at high temperatures, for example 100 to 200° C. Likewise, a noteworthy contribution to the art will be the provision of a styrene polymer which can be used to form a film base which combines crystallinity with orientation. An additional important contribution to the art will be a method for the preparation of such polymers.

It is also known in the art that crystalline polystyrene possesses fiber-forming characteristics in addition to its film-forming properties. Ordinarily, valuable crystalline polystyrene shaped articles are obtained by heating the styrene in powder form to high temperatures and extruding the molten polymer through slots or spinnerettes into films or fibers. These procedures are the conventional melt extrusion or melt spinning methods known in the prior art. Such techniques, although satisfactory, do involve the use of expensive equipment. Accordingly, it would be desirable to spin fibers from crystalline polystyrene by the conventional melt spinning processes utilizing a volatile solvent such as methylene chloride. However, until the present invention no one has been able to provide the art with crystalline polystyrene which is soluble in methylene chloride.

Accordingly, it is an object of this invention to provide new crystalline styrene polymers having enhanced properties.

Another object of this invention is to provide new photographic supports comprising oriented crystalline polystyrene.

Another object of this invention is to provide a photographic support comprising oriented crystalline polystyrene having heat distortion temperatures of 200° C. or higher.

Still another object of this invention is to provide a class of crystalline styrene polymers which, in addition to having heat distortion temperatures of 200° C. or higher, will not disorient at high temperatures, for example, 100 to 200° C.

Still another object of this invention is to provide crystalline polystyrene which is soluble in methylene chloride.

Still another object of this invention is to provide a method for the preparation of these styrene polymers.

Other objects will become apparent from a consideration of the description and claims which follow.

In accordance with this invention it has been found that crystalline polystyrene having a heat distortion temperature of 200° C. or higher and which will not disorient at high temperatures, e.g. 100 to 200° C., can be obtained by polymerizing styrene at a temperature within the range of about 20 to about 130° C. and a pressure within the range of about 0 to 1,000 p.s.i. in the presence of an ionic catalyst comprising (1) a halide of a transition metal from Groups IV–B to VI–B of the Periodic Table and (2) an aluminum alkyl. This oriented, crystalline, high softening polymer is eminently suitable for use as a film base. In addition, it has been found that one of the particular catalyst combinations of our invention will result in a methylene chloride-soluble crystalline isotactic styrene polymer which permits the preparation of valuable polystyrene fibers from the ordinary dry-spinning equipment commonly used by fiber manufacturers. This characteristic of the crystalline polystyrene of our invention could not have been predicted from the prior art since crystalline polystyrene made with conventional ionic catalysts comprising a metal alkyl and a transition metal halide would be expected to be insoluble in methylene chloride. Furthermore, there is no known correlation between the solubility of crystalline polystyrene and the solubility of amorphous polystyrene, except that the former is much less soluble than the latter. For example, conventional amorphous polystyrene is soluble in both benzene and dimethyl foramide while crystalline polystyrene is not.

A surprising feature of this invention is that crystalline polystyrene which is prepared according to prior art processes, for example, in the presence of Alfin-type catalysts, will not form an oriented, crystalline, high softening polymer that is suitable for use as a film base. In marked contrast, the crystalline polystyrene prepared using the catalyst of our invention, as indicated above, will form an oriented, crystalline, high softening polymer which is eminently suitable for use as a film base.

Another unexpected feature of this invention is the fact that crystalline polystyrene, preferably having an inherent viscosity of 1.5 or less, which is prepared in the presence of a catalyst containing aluminum trimethyl and vanadium trichloride is soluble in methylene chloride. In this connection, it has been found that only this particular ionic catalyst will result in a methylene chloride soluble crystalline styrene polymer. Hence, a very slight change in the catalyst combination, for example, when the aluminum trimethyl is replaced by aluminum triethyl, will result in crystalline polystyrene which is not soluble in methylene chloride. Accordingly, it is possible to obtain very high-solids dopes, e.g. those containing 50% or more of the polymer, although dopes containing 10 to 30% of the solid polymer are satisfactory for most purposes.

The smooth high-solids dopes which can be prepared by dissolving crystalline polystyrene in methylene chloride can be spun in conventional dry-spinning equipment to form fibers that, after orientation and stabilization, have at least as good properties as fibers obtained by ordinary melt spinning processes employing molten polystyrene. This is an extremely significant feature of the invention since it permits the preparation of valuable polystyrene fibers from the ordinary dry-spinning equipment commonly used by fiber manufacturers. In addition, these dopes can also be cast into uniform thin films that have excellent properties.

The catalysts which are employed in practicing this invention are an important feature of the process and include any of the conventional ionic polymerization catalysts comprising a halide of a transition metal from Group IV–B to Group VI–B of the Periodic Table and an aluminum alkyl. The Periodic Table referred to herein can be found in "Lange's Handbook of Chemistry," 8th edition (1952) published by Handbook Publishers, Inc. at pages 56 and 57.

The transition metals included in Groups IV-B-VI-B of the Periodic Table which comprise one component of the catalyst are exemplified by metals such as titanium, zirconium, vanadium, molybdenum, chromium and the like. The transition metal halide catalyst components can be used at their maximum valence, or if desired, a reduced valency form of the halide can be employed. It is preferred to use the vanadium chlorides which can be in the form of vanadium trichloride, for example. Examples of other transition metal halides that can be employed in the process of this invention include titanium tetrachloride, titanium trichloride, titanium tetrabromide, zirconium tetrachloride, zirconium tetrabromide, molybdenum pentachloride, chromium trichloride, vanadium tetrachloride and the like.

Suitable aluminum alkyls which can be employed in conjunction with the transition element halides include such compounds as, for example, aluminum trimethyl, aluminum triethyl, aluminum tributyl, ethyl aluminum dichloride, ethyl aluminum dibromide, ethyl aluminum sesquichloride, ethyl aluminum sesquibromide, dimethyl aluminum bromide, propyl aluminum dichloride, dibutyl aluminum chloride, diethyl aluminum chloride and the like.

Generally a mole ratio of aluminum alkyl to metal halide of 0.1:1 to 12:1 is satisfactory in the practice of this invention. The concentration of catalyst in the reaction medium can be varied over a wide range, for example, catalyst concentrations of 0.1% or less to 3% or more can be used.

The temperature of the polymerization process can be widely varied. However, temperatures ranging from about 0 to about 150° C. can generally be employed with temperatures within the range of about 20° C. to about 130° C. being preferred.

A suitable pressure range for the practice of the process of this invention includes pressures from about 0 to about 15,000 p.s.i. Generally it is desirable to use pressures within the range of about 0 to about 1,000 p.s.i. in order to obtain satisfactory rates of reaction.

The organic vehicle or solvent that can be employed as a reaction medium in the process of this invention includes aliphatic alkanes or cyclo alkanes such as propane, pentane, hexane, heptane, cyclohexane and the like or hydrogenated aromatic compounds such as tetrahydronaphthalene or decahydronaphthalene or a high molecular weight liquid paraffin or mixture of paraffins which are liquid at the reaction temperature or an aromatic hydrocarbon such as benzene, toluene, xylene and the like. The nature of the vehicle or solvent is subject to considerable variation, but the solvent should be in a liquid form at the reaction conditions and relatively inert to the reactants and reaction products. Other solvents which can be used include ethyl benzene, isopropyl benzene, ethyl toluene, n-propyl benzene, diethyl benzene, mono- and dialkyl naphthalenes, n-pentane, n-octane, isooctane, methyl cyclohexane, Tetralin, Decalin, mineral spirits and any of the other well known inert hydrocarbons.

The styrene polymers prepared by the process of this invention are characterized by one or more noteworthy properties including crystallinity, high heat distortion temperature, low moisture regain, methylene chloride solubil ity and will vary in molecular weight from about 25,000 or lower to 200,000 or higher. The molecular weight of these polymers is best determined by their inherent viscosities in Tetralin which range from about 1.0 to about 4.0.

The crystalline polystyrene of this invention is particularly adapted to use as film base and may be used in combination with any of the well known subbing agents or the photographic silver halide emulsions as described in the prior art. For example, suitable resins to be employed as subbing agents include polymers of methacrylate esters, cellulose esters and the like. The polystyrene film base can be coated with any of the conventional photographic silver halide emulsions. Typical photographic silver halide emulsions which can be used for this purpose include silver chloride, silver bromide, silver iodide, silver bromiodide, silver chlorobromide, silver chlorobromiodide and the like. The carrier for the silver halide can be gelatin, synthetic resin, albumin and the like.

This invention can be further illustrated by the following examples of preferred embodiments thereof although it will be understood that these examples are included merely for purposes of illustration and are not intended to limit the scope of the invention unless otherwise specifically indicated:

EXAMPLE 1

In a twenty gallon autoclave equipped with a high speed stirrer and under one atmosphere of dry nitrogen were placed 60 lb. of dry heptane, 23 lb. of freshly distilled styrene, 120 g. of triethylaluminum, and 170 g. of vanadium trichloride. After heating at 70° C. for 24 hours with rapid agitation, a yield of 18 lb. of polystyrene was obtained. The polystyrene was washed several times with hot anhydrous methanol, then with hot acetone, and finally with water to remove catalyst residues. The polystyrene, which was then in the form of a fine white powder, had a softening point above 200° C. and was highly crystalline.

To form a film base the polystyrene obtained by the above procedure was first converted into a more compact form by extruding at 300 to 350° C. in the form of ¼-inch rod which was then chopped into pellets of approximately ¼ inch in length. The pellets were heated to about 400° C. The molten polystyrene was then fed through a metering pump at a pressure of 50 to 200 p.s.i. and a temperature of 350 to 400° C. into an extruder hopper maintained at 400 to 450° C. The molten polystyrene was extruded at a rate of 15 to 250 inches per minute through a long, narrow slot having a width of 0.90 inch onto the surface of a casting wheel maintained at a temperature of 50 to 100° C. The resulting polystyrene film was taken off over a roller and led into a tank of water maintained at 10 to 25° C. The polystyrene film was then laterally stretched from 1.5 to 5 times in unit width on tenter belts. Then the polystyrene was longitudinally stretched 1.5 to 5 times in unit length.

During these stretching operations the polystyrene was maintained at a temperature of 95 to 105° C. The oriented polystyrene film was then heat set at a temperature of 105 to 115° C. while under tension so that no substantial shrinkage occurred. The film was then cooled to less than 30° C., resulting in a biaxially, oriented and heat set film possessing outstanding physical properties making it eminently suitable as a film base. This oriented crystalline styrene polymer had a heat distortion temperature above 200° C., a moisture regain of less than 0.1%, a tensile strength at yield above 20,000 p.s.i., at break above 16,000 p.s.i. and an elongation of 20 to 25%. The tensile properties at higher temperatures, i.e. 50, 70, 100 and 125° C. are very nearly equivalent to the aforementioned room temperature tensile properties.

The oriented crystalline polystyrene film was then oxidized to provide a surface on which a colloid subbing layer would adhere. The oxidation was accomplished by leading the oriented polystyrene film through a bath containing aqueous potassium dichromate maintained at 35 to 40° C. The contact time for this operation was 2 to 20 seconds and the potassium dichromate solution was made by saturating 95% sulfuric acid with potassium dichromate. The oxidized oriented crystalline polystyrene film which resulted from this operation has substantially the same appearance and physical properties as before oxidation with the exception that a subbing layer and an emulsion layer could now be made to adhere to it. The subbing and emulsion layers could be deposited on the polystyrene film base with conventional methods used in the manufacture of photographic elements, e.g. spraying, immersion of the surface of the film into a solution of the coating material or the like.

The following two examples will illustrate the manner of preparing subbing layers for the polystyrene film of our invention.

EXAMPLE 2

Polystyrene film having the characteristics described in Example 1 and a thickness of approximately 0.005 inch was coated with a solution of the following composition:

4.5 parts of weight of a 50–50 mixture of poly-n-butyl methacrylate and polyisobutyl methacrylate.
25.0 parts by weight of methanol.
3.05 parts by weight of n-butanol.
67.45 parts by weight #1 naphtha solvent.

This was followed by a coating of the following composition:

| | Parts by wt. |
|---|---|
| Cellulose nitrate containing approximately 11% nitrogen (high alcohol solubility) | 2.15 |
| β-Methoxyethanol | 8.7 |
| n-Butanol | 5.2 |
| #1 naphtha solvent | 25.0 |
| Methanol | 58.95 |

The subbing was completed with application of a solution of the following composition:

| | Parts by wt. |
|---|---|
| Gelatin | 1.2 |
| Glacial acetic acid | 1.0 |
| Water | 13.0 |
| β-Methoxyethanol | 10.0 |
| Methanol | 74.8 |

The subbed polystyrene sheeting was then coated with an ordinary photographic gelatino-silver-halide emulsion, such as a photographic gelatino-silver-bromiodide emulsion.

EXAMPLE 3

Polystyrene film was coated in the same manner as described in Example 2 with the solution of the methacrylate resins. In place of the two separate applications which followed, a single application was made of the following composition:

| | Parts by wt. |
|---|---|
| Gelatin | 1.25 |
| Cellulose nitrate containing approximately 11% nitrogen (high alcohol solubility) | 1.25 |
| Glacial acetic acid | 1.0 |
| Chromic chloride (based on amount of gelatin rather than total composition | 1.5 |
| Water | 3.5 |
| Actone | 50.0 |
| Methanol | Balance |

The polystyrene sheeting was then coated with an ordinary gelatino-silver-halide emulsion.

EXAMPLE 4

As indicated above, the ability to form an oriented, crystalline, high softening polymer which is eminently suitable as a film base is specific to crystalline polystyrene made according to the process of our invention. To illustrate this feature of our invention, highly crystalline polystyrene was made according to the procedure disclosed by Williams et al. in J. Am. Chem. Soc., 79, 1716 (1957), using an Alfin-type catalyst. The white free-flowing powder was cast into film by the procedure as in Example 1. The oriented polystyrene film was then held at a temperature of 110° C. for several hours in an attempt to crystallize or heat set the oriented film. The rate of crystallization of this polymer was very slow and the film disoriented faster than it crystallized. Accordingly, although it was possible to get an oriented amorphous polystyrene film or an unoriented crystalline polystyrene film, it was not possible to get an oriented crystalline polystyrene film base using this particular crystalline polystyrene. It was accordingly impossible to get a tough, high softening film base from this crystalline polystyrene, the properties of this film being too poor for practical use as a photographic film base, i.e. it was either high softening and brittle or tough but low softening. In contrast, the properties of films made from the crystalline polystyrene of our invention, as illustrated in Example 1, make it eminently suitable for use as a photographic film support.

As stated hereinabove, it is possible to obtain crystalline polystyrene by the process of our invention which polymer is soluble in methylene chloride. This aspect of the invention is illustrated by Examples 5 and 6 which follow.

EXAMPLE 5

In a 20-gal. autoclave equipped with a high speed stirrer and under one atmosphere of dry nitrogen were placed 60 lb. of dry heptane, 23 lb. of freshly distilled styrene, 120 g. of trimethylaluminum, and 170 g. of vanadium trichloride, in that order. After heating at 70° C. for 24 hours with rapid agitation, a yield of 18 lb. of polystyrene was obtained. This material was washed with methanol, acetone, and water to remove catalyst residues and was dried. The polystyrene, which had an I.V. of 1.0, was in the form of a fine, white powder and was highly crystalline.

Twenty-five parts, by weight, of this polystyrene was dissolved in 75 parts, by weight, of methylene chloride. After agitation for several hours at 25° C. a smooth, clear, viscous spinning dope was obtained. This dope was spun into fibers in conventional dry-spinning equipment. The fibers were drafted 400% at 100° C. and were stabilized by heat-setting at 150° C. for 5 minutes. Fibers so obtained had a tenacity of 2.0 g. per denier, 25% extensibility, and a flow point of 200° C.

A 16 denier stabilized fiber drawn from another sample of crystalline isotactic polystyrene prepared by the above procedure has a shrinkage of 11% (air oven 200° C. for 30 seconds), an elongation of 6% and a tenacity of 1.17 grams per denier.

EXAMPLE 6

Twenty-five parts, by weight, of the polystyrene prepared in Example 5 was dissolved in 75 parts, by weight, of methylene chloride. After agitation for several hours at 25° C. a smooth, clear, viscous dope was obtained. This dope was cast on a glass plate using a doctor blade set at 10 mils. The resultant film, after two-way stretching (200% each direction), was heat set at 135° C. It was clear and tough and was extremely resistant to water. It had a heat distortion temperature above 200° C.

EXAMPLE 7

In contrast to the product prepared in Examples 5 and 6 above, a crystalline styrene polymer prepared in the presence of an aluminum triethyl-titanium tetrachloride catalyst is found to be insoluble in methylene chloride. Hence 26 grams of dry styrene, 50 ml. of dry heptane, 1.8 g. of triethylaluminum and 0.8 g. of titanium tetrachloride were placed in a pressure vessel under nitrogen and were agitated at 70° C. for 15 hr. The resultant slurry, after washing with methanol, acetone, and methyl ethyl ketone, yielded 7 g. of polystyrene. It was crystalline and had an inherent viscosity in hot Tetralin of 2.5. It was not soluble in methylene chloride.

In still another run 60 g. of dry heptane, 23 g. of freshly distilled styrene, 120 g. of triethylaluminum and 170 g. of vanadium trichloride were addde to a 20-lb. autoclave equipped with a high speed stirrer. The addition was accomplished under one atmosphere of dry nitrogen. After heating at 70° C. for 24 hr. at rapid agitation, a yield of 18 g. of polystyrene was obtained. The material after washing with methanol and acetone was dried. It had an inherent viscosity of 2.7 and was not soluble in methylene chloride.

Thus, by the practice of this invention, there is provided a crystalline, high-softening styrene polymer which is an excellent replacement for amorphous styrene polymers now being used in photographic film base. However, the polystyrene of our invention, since it is so much higher softening than amorphous polystyrene, completely eliminates the latter's greatest deficiency, i.e. its low softening point. Furthermore, the methylene chloride solubility of the crystalline styrene polymers forming a part of this invention makes it possible to prepare valuable polystyrene fibers in the ordinary dry-spinning equipment commonly used by fiber manufacturers.

Although the invention has been described in considerable detail with reference to certain preferred embodiments thereof, it will be understood that variations and modifications can be effected without departing from the spirit and scope of the invention as described hereinabove and as defined in the appended claims.

We claim:

1. The process for producing crystalline polystyrene which is soluble in methylene chloride which process comprises polymerizing styrene at a temperature of about 70° C. and a pressure of about 15 p.s.i. in the presence of an ionic catalyst consisting essentially of vanadium trichloride and trimethyl aluminum.

2. A composition of matter comprising a solution of crystalline polystyrene in methylene chloride, said polystyrene being produced by the process of claim 1.

3. A fiber of crystalline isotactic polystyrene having a tenacity of at least one gram per denier, said crystalline isotactic polystyrene being prepared by contacting styrene at a temperature of about 70° C., in heptane, with a catalyst consisting essentially of trimethyl aluminum and vanadium trichloride.

References Cited

UNITED STATES PATENTS

| | | | |
|---|---|---|---|
| 2,872,318 | 2/1959 | Starck | 96—87 |
| 3,019,077 | 1/1962 | Carey et al. | 260—93.5 |
| 3,046,245 | 7/1962 | Kern et al. | 260—30.4 |
| 3,053,661 | 9/1962 | Starck et al. | 96—87 |
| 3,014,016 | 12/1961 | Natta et al. | 260—93.5 |
| 3,069,406 | 12/1962 | Newman et al. | 260—93.5 |
| 3,414,553 | 12/1968 | Kern | 260—93.5 |
| 3,435,018 | 3/1969 | Natta et al. | 260—93.5 |

FOREIGN PATENTS

| | | |
|---|---|---|
| 1,220,681 | 1/1960 | France. |

OTHER REFERENCES

Atti Acad. Nazl Lincei Rend. Classe Sci. Fis. Mat. Nat., vol. 18, pp. 19–27, January 1955.

JAMES A. SEIDLECK, Primary Examiner

U.S. Cl. X.R.

96—87 R; 252—429 A; 260—93.5 S